(12) United States Patent
Kinoshita et al.

(10) Patent No.: US 8,910,007 B2
(45) Date of Patent: Dec. 9, 2014

(54) APPARATUS AND METHOD FOR ERROR CHECK OF TRANSMISSION DATA

(75) Inventors: Takayuki Kinoshita, Kawasaki (JP);
Hidekazu Osano, Kawasaki (JP);
Yoshikazu Iwami, Kawasaki (JP);
Makoto Hataida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 451 days.

(21) Appl. No.: 13/225,066

(22) Filed: Sep. 2, 2011

(65) Prior Publication Data

US 2011/0320900 A1 Dec. 29, 2011

Related U.S. Application Data

(63) Continuation of application No. PCT/JP2009/054396, filed on Mar. 9, 2009.

(51) Int. Cl.
*H04L 1/18* (2006.01)
*H04L 1/08* (2006.01)
*H04L 1/16* (2006.01)

(52) U.S. Cl.
CPC ................................ *H04L 1/1854* (2013.01)
USPC ............ 714/748; 714/749; 714/750; 714/751; 714/752; 714/776

(58) Field of Classification Search
None
See application file for complete search history.

(56) References Cited

U.S. PATENT DOCUMENTS

| | | | |
|---|---|---|---|
| 5,410,536 A | 4/1995 | Shah et al. | |
| 6,574,770 B1 * | 6/2003 | Daudelin | 714/776 |
| 6,862,299 B2 | 3/2005 | Popescu | |
| 7,315,542 B2 * | 1/2008 | Gil et al. | 370/392 |
| 7,991,875 B2 * | 8/2011 | Chou et al. | 709/224 |
| 8,166,090 B2 * | 4/2012 | DeLaquil et al. | 708/446 |
| 8,489,951 B2 * | 7/2013 | Peisa et al. | 714/748 |
| 2003/0002501 A1 * | 1/2003 | Reme | 370/389 |
| 2003/0123403 A1 | 7/2003 | Jiang | |
| 2005/0135261 A1 * | 6/2005 | Lee et al. | 370/241 |
| 2006/0203823 A1 | 9/2006 | Jiang | |
| 2007/0005248 A1 * | 1/2007 | Averill et al. | 701/301 |
| 2009/0210770 A1 * | 8/2009 | DeCusatis et al. | 714/758 |
| 2013/0028189 A1 * | 1/2013 | Bourlas | 370/328 |
| 2013/0070675 A1 * | 3/2013 | Coffman | 370/328 |

FOREIGN PATENT DOCUMENTS

| | | |
|---|---|---|
| DE | 691 20 659 T2 | 1/1997 |
| DE | 602 11 673 T2 | 5/2007 |
| EP | 0 513 232 B1 | 7/1996 |
| EP | 1 377 217 B1 | 5/2006 |

(Continued)

OTHER PUBLICATIONS

International Search Report for PCT/JP2009/054396, mailed Apr. 7, 2009.

*Primary Examiner* — Justin R Knapp
(74) *Attorney, Agent, or Firm* — Staas & Halsey LLP (57) ABSTRACT

An error check apparatus including, a packet protocol error check processing circuit configure to detect a protocol error of a packet, a retry control circuit configured to receive the protocol error of the packet from the packet protocol error check processing circuit, and to perform request for retry for data of the packet if the received protocol error has not been detected from a packet retransmitted by retry request, and an error notification circuit configured to notify of the protocol error of the packet to a processing unit in a higher-level layer if the protocol error is not a first protocol error for the packet.

7 Claims, 6 Drawing Sheets

(56) References Cited

FOREIGN PATENT DOCUMENTS

| | | |
|---|---|---|
| GB | 2 250 897 A | 6/1992 |
| JP | 1-300730 | 12/1989 |
| JP | 5-503197 | 5/1993 |
| JP | 10-135935 | 5/1998 |
| JP | 2003-264607 | 9/2003 |
| JP | 2004-526518 | 9/2004 |
| JP | 2005-72950 | 3/2005 |
| JP | 2006-186557 | 7/2006 |
| JP | 2006-211632 | 8/2006 |
| WO | 92/10893 | 6/1992 |
| WO | 02/083000 A1 | 10/2002 |

* cited by examiner

(TRANSMIT DATA NUMBER WITH ERROR)

(B)

(NOTIFICATION OF HEAD DATA NUBMER (NO. 0) OF PACKET)

PROTOCOL ERROR NOTIFICATION FOR SECOND ONE (WITH RETRANSMISSION)

F I G. 5

F I G. 6

APPARATUS AND METHOD FOR ERROR CHECK OF TRANSMISSION DATA

CROSS-REFERENCE TO RELATED APPLICATION

This application is a continuation application of International Application PCT/JP2009/054396 filed on Mar. 9, 2009 and designated the U.S., the entire contents of which are incorporated herein by reference.

FIELD

The present invention discussed herein relates to an apparatus and method for error check of transmission data.

BACKGROUND

In packet transmission, a packet format check process is performed after a transmission error check process at the data recipient side.

In the transmission error check process, an error is recovered by determining it as a transmission path error according to error detection (CRC (Cyclic Redundancy Check) error, parity error, for example) and performing retransmission request.

In a protocol error check process, a setting error, determination mistake and the like at the transmission source is determined according to error detection (for example, detection of an undefined packet), and the transmission is terminated by closing the port, or a retry process at a higher level layer is performed.

[Patent Document 1] Japanese Laid-open Patent Publication No. 2006-186557
[Patent Document 2] Japanese Laid-open Patent Publication No. 2006-211632
[Patent Document 3] Japanese Laid-open Patent Publication No. 2005-072950
[Patent Document 4] Japanese Laid-open Patent Publication No. 2003-264607

SUMMARY

According to an aspect of the error check apparatus, the error check apparatus includes a packet protocol error check circuit. Then, the error check apparatus includes the following constituent elements.

A retry control circuit receives a protocol error of a packet from the packet protocol error check processing circuit, and performs a process to request retry for data of the packet if the received protocol error has not been detected from a packet retransmitted by retry.

An error notification circuit notifies of the protocol error of the packet if the protocol error is not the first protocol error for the packet.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Errors overlooked in a transmission error check process occur at a certain rate. Therefore, it follows that packet protocol errors due to overlooked transmission errors occur at a certain rate.

A protocol error due to a transmission error is originally an error that can be recovered by retry. Conventionally, even a protocol error that can be recovered by retry has been treated by a system shut down and the like by determining it as critical as well as the normal protocol error, which leads to a decrease in the system operation continuity.

In recent years, data transmission speed has been increased, and there is a tendency that even if the bit error rate (BER) is low, the rate of occurrence of missed error check for the transmission path during the system operation increases. Therefore, in a core system for which a high reliability is required, the rate of occurrence of missed error check is reaching a nonnegligible level.

Particularly, data transmission that requires real-time and high-speed characteristics, such as transmission between CHIPs between a computer, a protocol error must be treated by a system shut down, since retry control at a higher-level layer where software intervenes.

Hereinafter, an example of an embodiment of the present invention is explained based on FIG. 1-FIG. 6. Meanwhile, the process procedure illustrated in FIG. 3 in the form of a flowchart is not to limit the order of the processes. Therefore, it is obvious that, when applicable, the order of the processes may be switched around.

Figure 1:
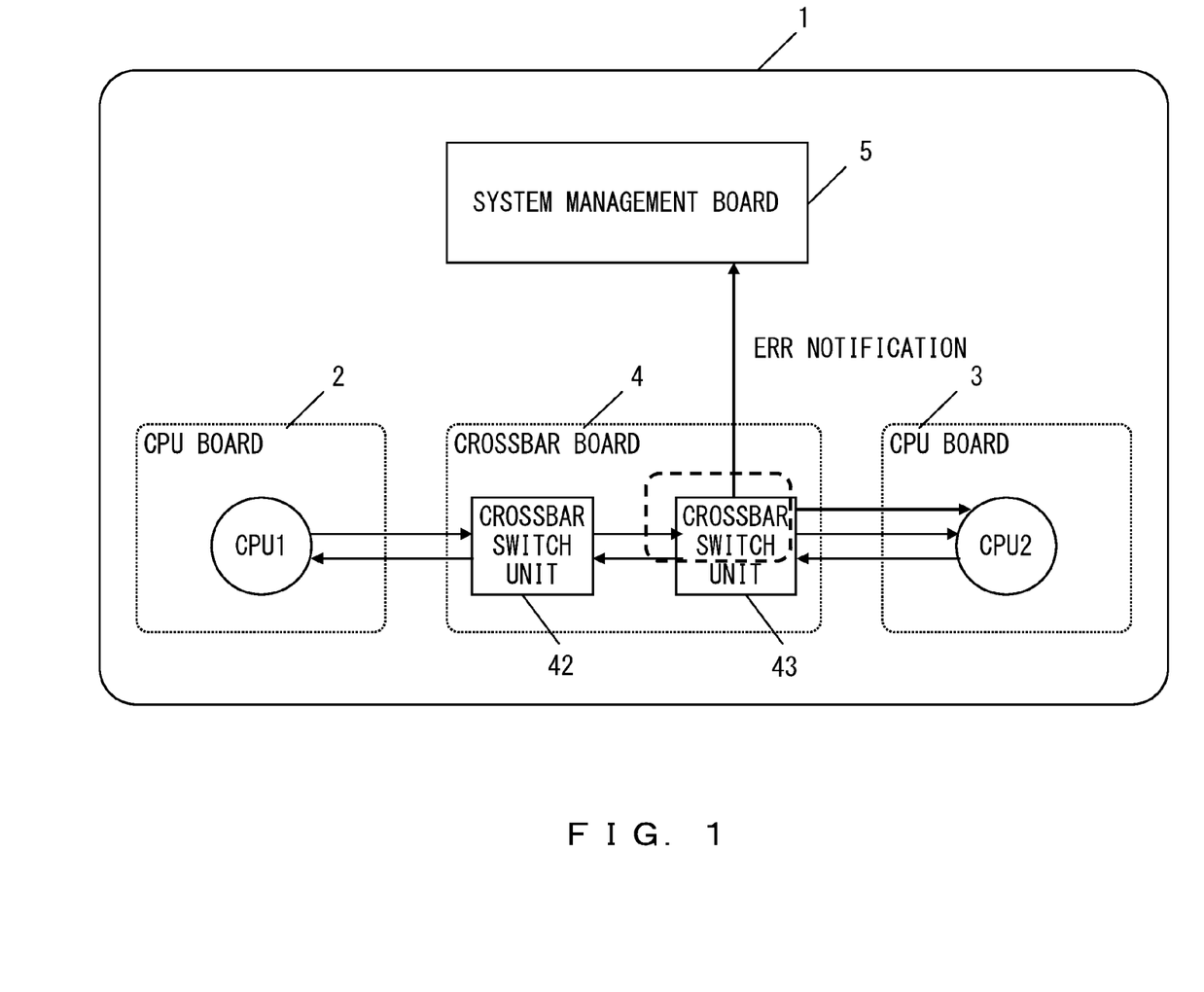
FIG. 1 is a diagram illustrating a connection example of a computer system implementing an error check apparatus disclosed herein.

FIG. 1 is a diagram illustrating a connection example of a computer system implementing an error check apparatus disclosed herein.

In FIG. 1, 1 represents a computer system implementing an error check apparatus disclosed herein, 2 and 3 represent CPU boards performing data processing, 4 represents a crossbar board controlling link and switch between the two CPU boards 2 and 3, and 5 represents a system management board managing the system.

The crossbar board 4 includes crossbar switch units 42 and 43 that relay data communication of the CPU boards 2, 3 respectively. The crossbar switch units 42, 43 respectively include an error check apparatus 10.

Figure 2:
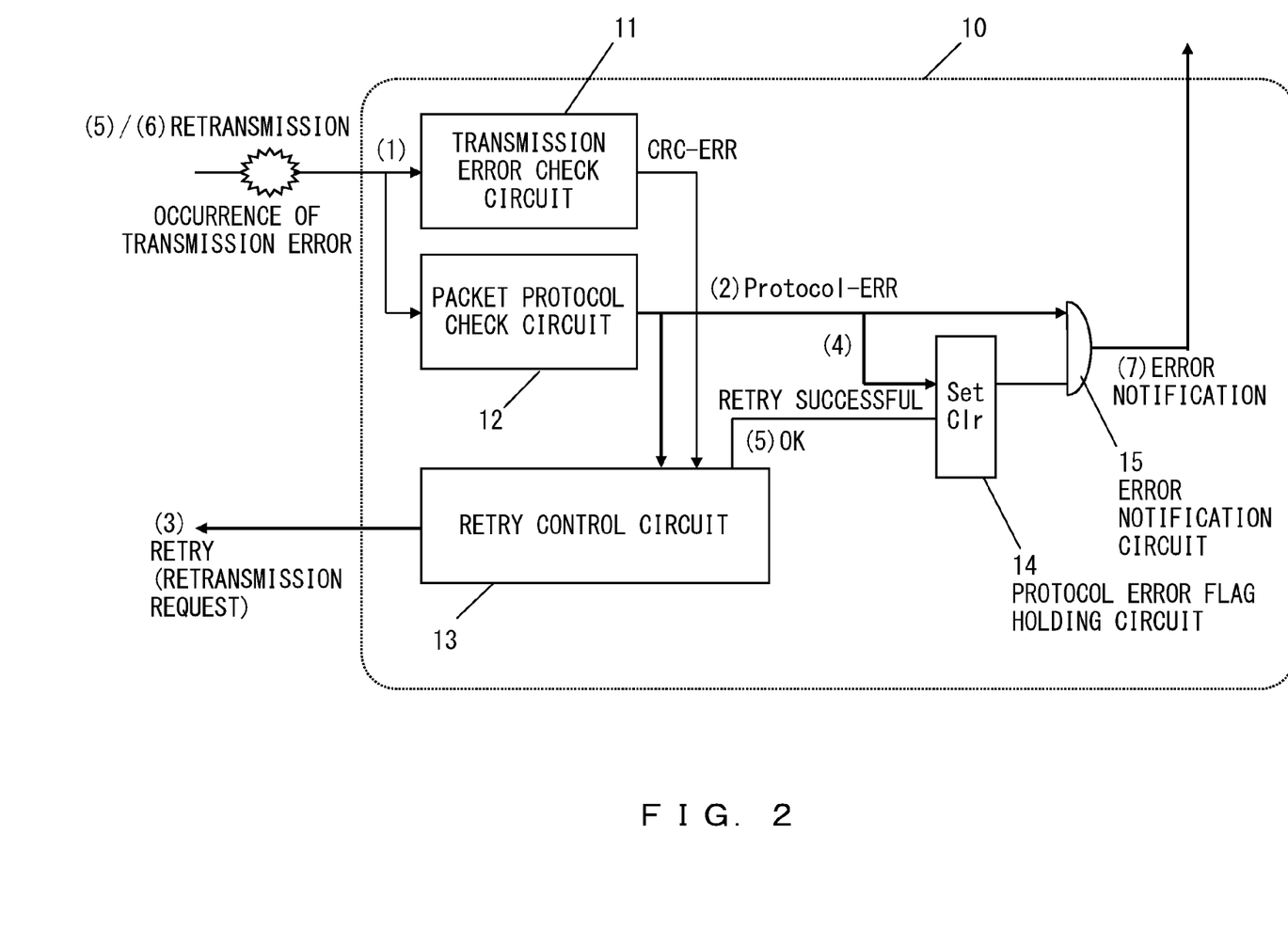
FIG. 2 is a diagram illustrating a configuration example in an example of the error check apparatus.

FIG. 2 is a diagram illustrating a configuration example in an example of the error check apparatus 10.

FIG. 2 illustrates the internal configuration of the error check apparatus 10 provided in the crossbar switch unit 43.

The error check apparatus 10 includes a transmission error check circuit 11, a packet protocol check circuit 12, a retry control circuit 13, a protocol error flag holding circuit 14, and an error notification circuit 15.

The transmission error check circuit 11 detects a transmission error of received data. For example, it performs a CRC check process. The transmission error check circuit 11 transmits a detected transmission error signal to the retry control circuit 13.

The packet protocol check circuit 12 detects an error in the protocol format of a packet in reception data for which no error was detected in the transmission error check circuit 11. The packet protocol check circuit 12 transmits a detected protocol error signal to the retry control circuit 13, the protocol error flag holding circuit 14, and the error notification circuit 15.

The retry control circuit 13 receives a signal from the transmission error check circuit 11, and requests retry of data transmission related to the transmission error.

In addition, when the retry control circuit 13 receives a signal from the packet protocol check circuit 12, the retry control circuit 13 determines whether the received packet related to the protocol error has been retransmitted by the retry that the circuit itself requested, and if the packet is not the one retransmitted by the retry, the retry control circuit 13 requests retry of transmission from the head data of the packet. On the other hand, if the packet is the one retransmitted by the retry that the circuit itself requested, the retry control circuit 13 does not perform the retry request.

Further, if the retry of the packet for which retry has been requested is successful, that is, if no error is detected from the retransmitted packet, the retry control circuit 13 transmits a setting clear signal to the protocol error flag holding circuit 14.

Upon receiving a signal of a protocol error from the packet protocol check circuit 12, the protocol error flag holding circuit 14 sets a flag indicating detection of a protocol error. Upon receiving the setting clear signal, the protocol error flag holding circuit 14 clears the setting of the flag.

Upon receiving a signal of a protocol error from the packet protocol check circuit 12, and if the received protocol error is not the first protocol error for a received packet, the error notification circuit 15 sends notification of the protocol error of the packet to the system management board 5.

Hereinafter, using FIG. 2, the processing operation of the error check apparatus 10 is explained. The part enclosed by a dotted line in the configuration example of the error check apparatus 10 illustrated in FIG. 2 schematically represent that it corresponds to the part enclosed by a broken line in FIG. 1.

(1) The transmission error check circuit 11 of the error check apparatus 10 provided in the crossbar switch unit 43 of the crossbar board 4 receives data transmitted from the CPU1 of the CPU board 2. Here, it is assumed that a transmission error has occurred in the transmitted data.

It is assumed that the transmission error check circuit 11 overlooked the transmission error occurring in the received data and could not detect the error (CRC-ERR). In this case, no CRC-ERR signal is transmitted.

(2) Upon detecting a protocol error (Protocol-ERR) that occurred due to the occurring transmission error, the packet protocol check circuit 12 transmits a Protocol-ERR signal to the retry control circuit 13, a protocol error flag holding circuit 14, and an error notification circuit 15.

The error notification circuit 15 does not transmit any error notification as a flag indicating a protocol error is not set in the protocol error flag holding circuit 14.

(3) Upon receiving the Protocol-ERR signal and if retry has not been requested about a packet related to the signal, the retry control circuit 13 transmits retry (retransmission request) in which the head data number of the packet is set.

(4) Upon receiving the Protocol-ERR signal, the protocol error flag holding circuit 14 sets a flag indicating a protocol error.

(5) After that, the transmission error check circuit 11 receives data retransmitted by the retry. If the received data is normal, no CRC-ERR signal is transmitted.

Following that, the packet protocol check circuit 12 checks the packet protocol of the received data.

The retry control circuit 13 determines that the retransmitted packet is normal and the retry is successful as no protocol error has been detected in the packet protocol check circuit 12, and transmits a clear signal for the flag setting to the protocol error flag holding circuit 14. The protocol error flag holding circuit 14 clears the flag setting.

Hereinafter, it is assumed that an original protocol error has occurred in data transmitted from the CPU1 of the CPU board 2, and in the process in (2) above, the packet protocol check circuit 12 detected the true protocol error.

In this case, instead of the case in (5) above, the processing operation is performed as in (6) and beyond.

After that, the transmission error check circuit 11 receives the data retransmitted by the retry, and if the transmission error check circuit 11 does not detect any transmission error from the received data, the transmission error check circuit 11 does not transmit any CRC-ERR signal.

Next, The packet protocol check circuit 12 checks the packet protocol of the received data. Upon detecting a protocol error, the packet protocol check circuit 12 transmits a Protocol-ERR signal.

(7) Upon receiving the Protocol-ERR signal, the error notification circuit 15 determines it as the second protocol error as the flag of the protocol error flag holding circuit 14 is set, and transmits an error notification (the second protocol error) to the system management board 5.

Upon receiving the Protocol-ERR signal, the retry control circuit 13 determines that the protocol error is the protocol error of the packet retransmitted by the retry, and does not transmit any retry request.

Thus, even when a protocol error is detected from transmitted data, there is a possibility that it is a protocol error due to overlooking of a transmission error, so the retry control circuit 13 requests retry from the head data of a packet, and the error notification circuit 15 does not transmit any error notification to the system management board 5. Meanwhile, when a protocol error is detected from retransmitted data, that is, when a second protocol error is detected, the error notification circuit 15 transmits an error notification to the system management board 5.

Since it cannot be expected that a protocol error occurs continuously unless there is a fixed failure, it is possible to determine whether a protocol error is due to overlooking of transmission data, by checking the protocol error with one retry.

Figure 3:
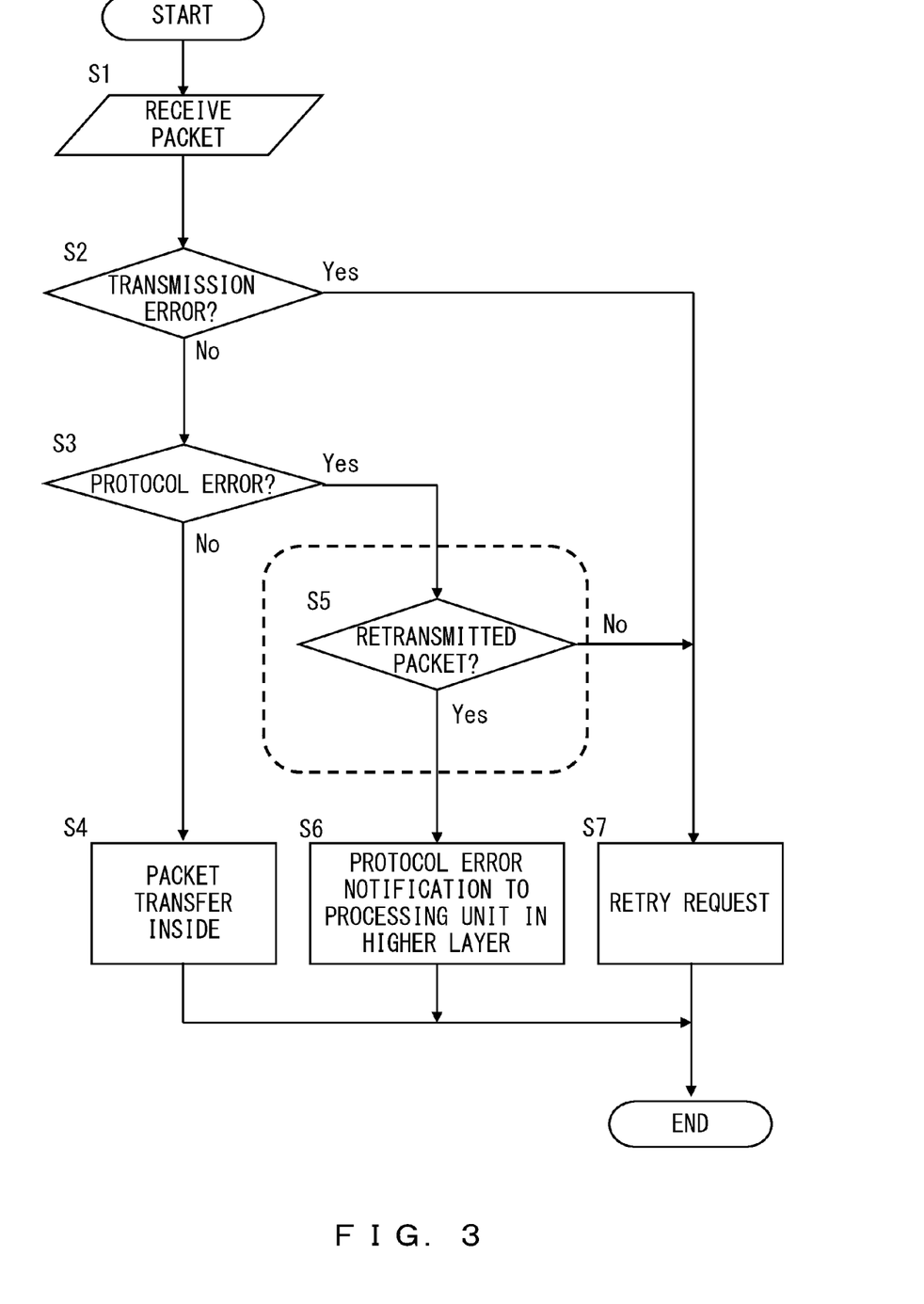
FIG. 3 is a diagram illustrating the process flow in the error check apparatus.

FIG. 3 is a diagram illustrating the process flow in the error check apparatus 10.

When the error check apparatus receives a packet (step S1), the transmission error check circuit 11 performs transmission error check (step S2). If no transmission error is detected (No in step S2), the packet protocol check circuit 12 performs protocol error check (step S3). If no protocol error is detected (No in step S3), the packet is transferred to the inside of the crossbar switch unit 43 as usual operations of no error (step S4).

If a protocol error is detected in the process in step S3 (Yes in step S3), the retry control circuit 13 determines whether the received packet is a retransmitted packet (step S5). If the received packet is a retransmitted packet (Yes in step S5), it is determined as a critical error, and the error notification circuit 15 transmits an error notification to the system management board 5 in a higher-level layer (step S6).

In the process in step S5, if the received packet is not a retransmitted packet (No in step S5), the retry control circuit 13 transmits a retry request in which the head data number of the received packet to the opposite (step S7).

In the process in step S2, if a transmission error is detected (Yes in step S2), the retry control circuit 13 transmits a retry request in which the data number in which the error is detected, to the opposite (step S7).

Figure 4:
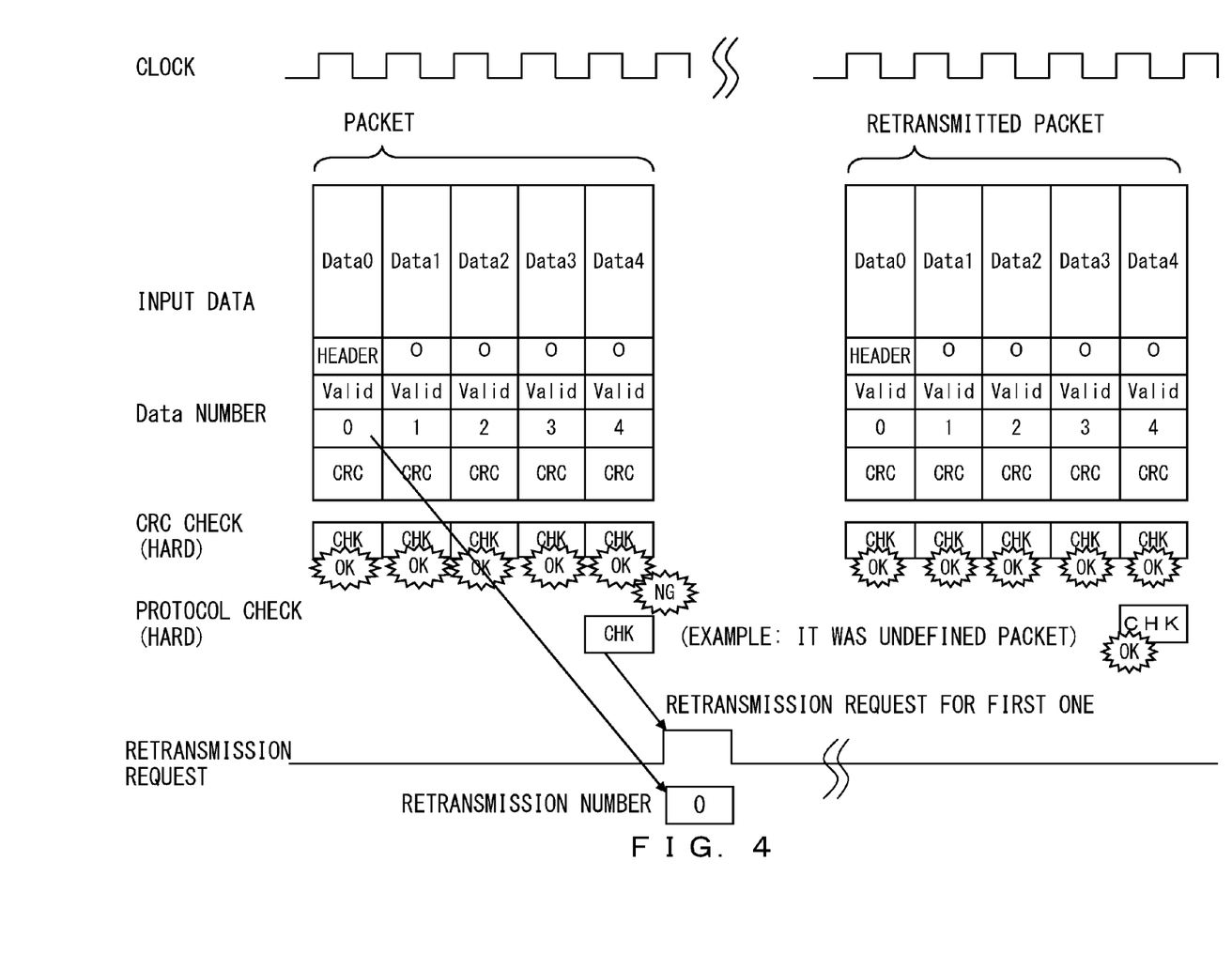
FIG. 4 is a diagram illustrating the relationship with the packet and check timing.

FIG. 4 is a diagram illustrating the relationship between a packet and check timing.

For example, it is assumed that a packet to be transmitted consists of five pieces of input data (Data 0-4) of a predetermined unit. The transmission error check process is performed for every input data. The protocol check process is performed for the whole of the packet after the check process of each input data (Data 0-4) constituting the packet.

Therefore, in the process in step S7 in FIG. 3, when the retransmission request (retry) is transmitted for the protocol error detected for every packet, it is performed while specifying the data number (retransmission number=0) indicating the head data of the packet for which retransmission is requested.

Accordingly, the packet to be retransmitted is all the input data from the head (Data 0-4). For the retransmission packet, in the same manner, the transmission error check in units of input data and the protocol error check in units of packets are performed.

As described above, even if a protocol error due to overlooking of transmission data is included in protocol errors detected in the packet protocol check circuit 12, error recovery can be performed by retry request from the head data of the packet. In addition, since only the true protocol error is transmitted to the system management board 5, unnecessary system shut down can be suppressed. Therefore, it becomes possible to improve the operation continuity of the system.

Figure 5:
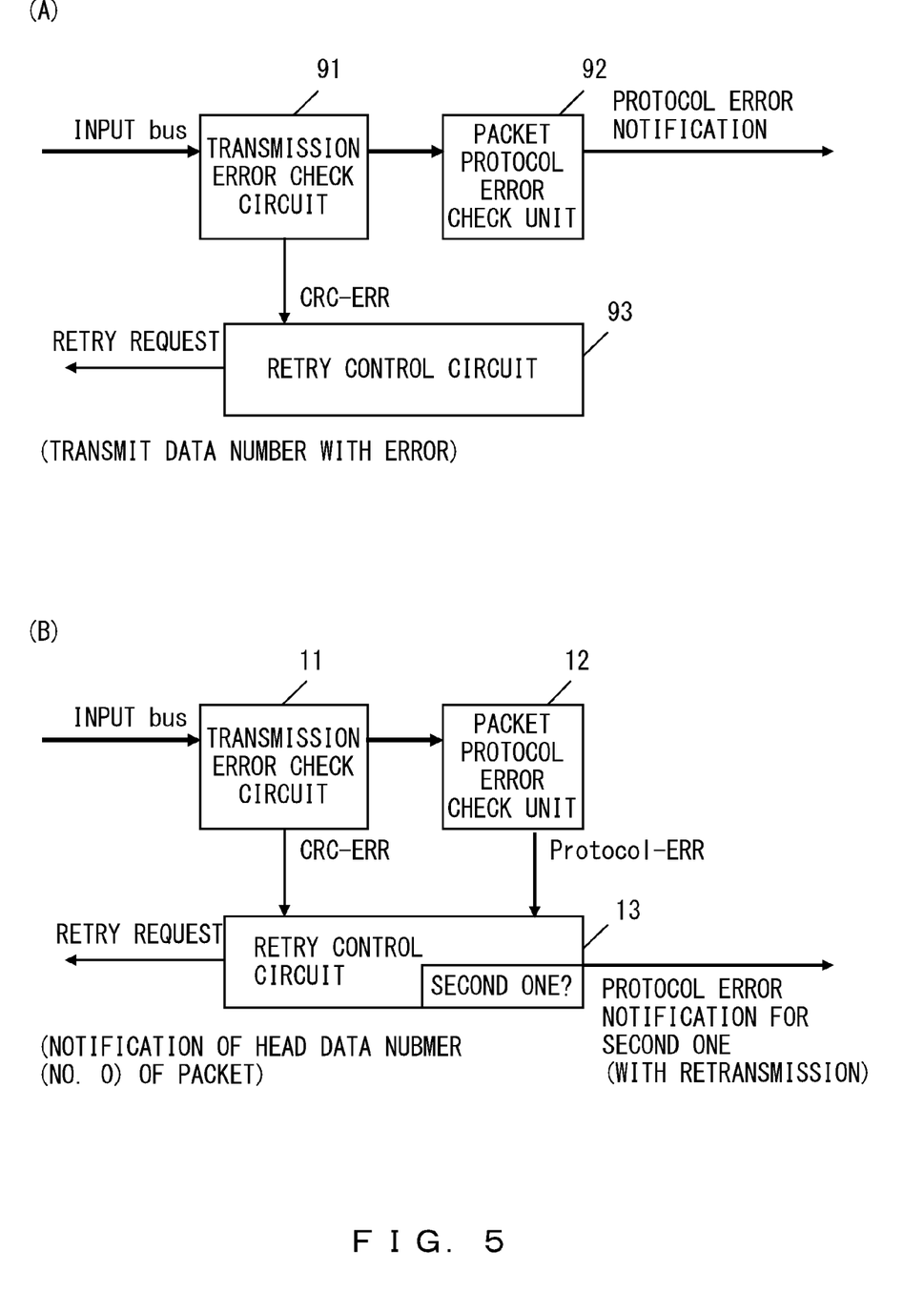
FIG. 5 is a diagram for comparing the configuration in the error check apparatus disclosed herein and the configuration according to the related retry control.

FIG. 5 is a diagram for comparison between the configuration in the error check apparatus 10 disclosed herein and the configuration according to the related retry control.

As illustrated in FIG. 5(A), in the related retry control, a transmission error check circuit 91 receives input data, and if the transmission error check circuit 91 detects a transmission error, the transmission error check circuit 91 transmits a transmission error signal (CRC-ERR) to the retry control circuit 93. Then, the retry control circuit 93 transmits retry request of the data number in which the transmission error is detected, according to the transmission error signal (CRC-ERR).

Then, if the transmission error check circuit 91 does not detect any transmission error from input data, further, the input data is given to the packet protocol error check unit 92. If the packet protocol error check unit 92 detects a protocol error from the input data, the packet protocol error check unit 92 transmits a protocol error notification to the processing unit in a further higher-level layer.

By contrast, in the error check apparatus 10, as illustrated in FIG. 5(B), if the transmission error check circuit 11 receives input data and does not detect any transmission error, the transmission error check circuit 11 gives the input data to the packet protocol error check unit 12. If the packet protocol error check unit 12 detects a protocol error from the input data, the packet protocol error check unit 12 transmits a protocol error notification. If the retry control circuit 13 receives the protocol error notification, the retry control circuit 13 determines whether the protocol error notification is about a retransmitted packet, and if the protocol error notification is not about a retransmitted packet (second protocol error signal), the retry control circuit 13 transfers retry request specifying the head data number of the packet for the retransmission number to the counterpart of the transmission. If the protocol error notification is about a retransmitted packet (second protocol error signal), notification of the protocol error is sent to the system management board 5 that is a processing unit of a further higher-level layer.

Since the error check apparatus 10 can be implemented only by adding a mechanism to transmit a protocol error signal to the retry control circuit 13 and a processing unit to determine whether the protocol error is the first one or the second one (whether or not retransmitted) to an existing processing configuration, implementation can be done without implementation of a complex mechanism or high cost burden.

Figure 6:
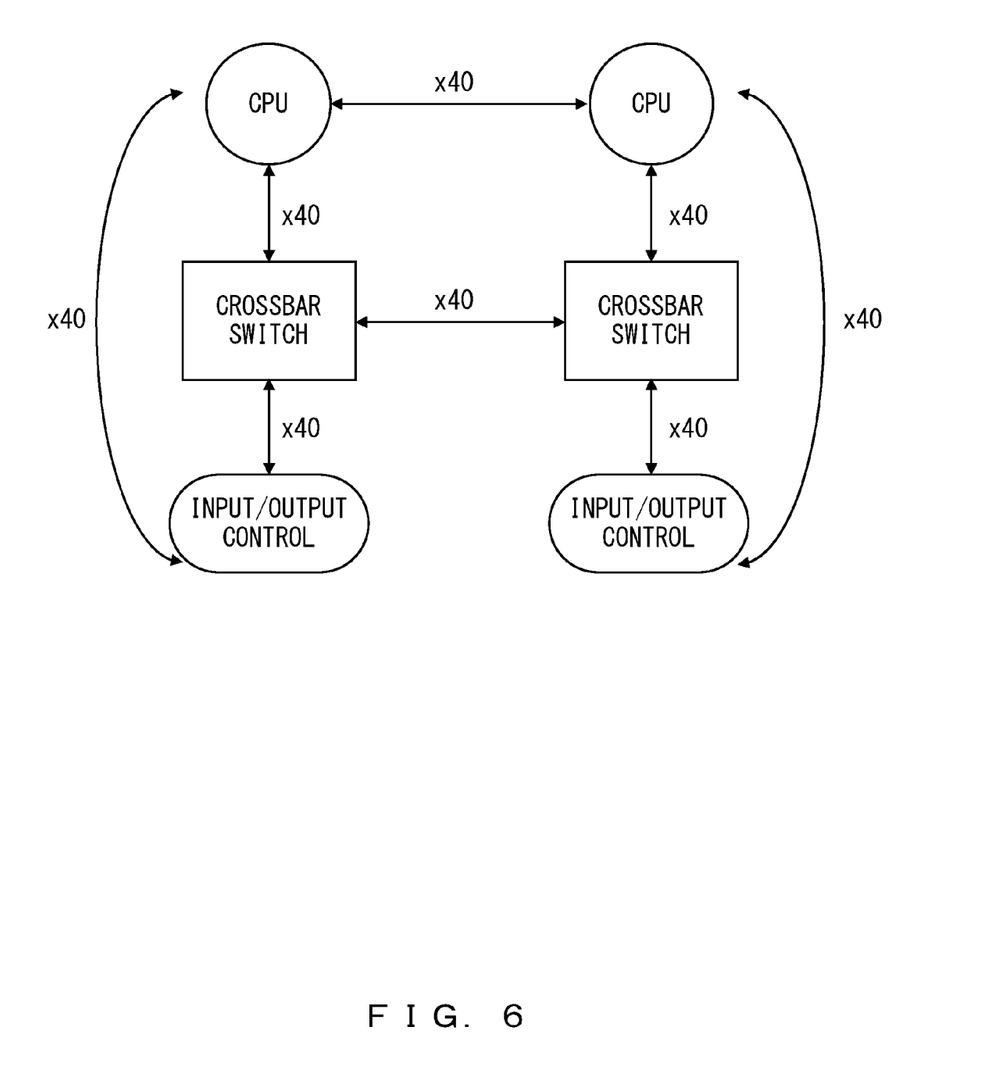
FIG. 6 is a diagram for explaining the effect of the error check apparatus.

FIG. 6 is a diagram for explaining the effect of the error check apparatus 10.

In a small-scale server having two CPUs, the frequency of system shutdown due to a protocol error caused by missed transmission error check, in on the following conditions.

Transmission speed: 6.4 Gbps
Bit error rate (BER): $1/10^{14}$
Bus utilization: 50%
Overlooking rate (8Bcrc): $1/2^8$ (in the case of BURST9 or above)

In this case, assuming the rate of occurrence in the case of BURST9 (9 consecutive bit errors) and above as "BER×1/1000 (occurrence rate of once every 1000 errors), the rate of occurrence of overlooking is "$1/(6.4\ G/10^{14})\times 256\times 1000/2 = 2.5\times 10^{10}$", that is, once every 250 years per a transmission path.

Therefore, as illustrated in FIG. 6, when there are 40 lines of transmission paths respectively between the respective crossbar switches, input/output control units of the two CPUs, the total number of transmission paths in the server is 320. Converting for the 320 transmission paths, overlooking of an error would occur once 0.8 of a year, and if 10 units of such a system are provided, it would occur once every month. Therefore, according to the error check apparatus 10 disclosed herein, error recovery by retry can be performed for the protocol error due to overlooking of a transmission error that happens at a high rate even in a small configuration, making it possible to suppress decrease in the operation continuity and to improve the reliability of the system.

While the present invention has been described according to the embodiment, it is obvious that the present invention may be modified in various ways within the scope of its gist, and the error check apparatus 10 may be applied to various data communication and data transmission units of information processing apparatuses.

According to the error check apparatus, upon receiving a protocol error of a packet from the packet protocol error check processing circuit, the retry control circuit requests retry for data of the packet if the received protocol error is not the one detected from a packet retransmitted by retry.

Then, the error notification circuit sends notification of the protocol error of the packet to a processing unit in a higher-level layer such as the system management unit and the like, if the protocol error is not the first protocol error for the packet.

Then, upon receiving the protocol error from the packet protocol error check processing circuit that detected the protocol error due to a transmission error overlooked in the transmission error check process, the error check apparatus treats the protocol error as a transmission error that may originally be detected, and requests retry for the packet. After that, if the packet protocol error check processing circuit detects the second protocol error from the packet retransmitted by the retry as well, the protocol error is treated as a true protocol error, and notification of the error is performed.

As described above, the error check apparatus is capable of recovering an error by requesting retry for a protocol error due to overlooking in the transmission error check and performing error notification only for a true protocol error, making it possible to suppress unnecessary system shut down due to an error for which retry recovery can be performed, and to continue the operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An error check apparatus for transmission data, the error check apparatus comprising:
    a packet protocol error check processing circuit configured to detect a protocol error of a packet;
    a retry control circuit configured to receive the protocol error of the packet from the packet protocol error check processing circuit, and to perform request for retry for data of the packet, and
    an error notification circuit configured to notify of the protocol error of the packet to a processing unit in a higher-level layer when the protocol error is not a first protocol error for the packet.

2. The error check apparatus for transmission data according to claim 1, wherein
    the retry control circuit performs a process to request for retry from head data of the packet.

3. The error check apparatus for transmission data according to claim 1, further comprising:
    a protocol error flag holding circuit configured to receive a protocol error of a packet from the packet protocol error check processing circuit and to hold a flag indicating a protocol error detected in a packet, wherein
    the error notification circuit performs a process to send notification of a protocol error of the packet when the received protocol error of the packet is an already detected protocol error, according to the protocol error flag holding circuit.

4. The error check apparatus for transmission data according to claim 1, wherein, the retry control circuit performs the request for retry for data of the packet-when the received protocol error has not been detected from a packet retransmitted by a retry request of the retry circuit itself.

5. A processing method executed by an error check apparatus for transmission data, the processing method comprising:
    detecting a protocol error of a packet, receiving the protocol error of the packet;
    requesting retry for data of the packet
    determining whether the received protocol error is a first protocol error for the packet; and
    notifying of the protocol error of the packet to a processing unit in a higher-level layer when the protocol error is not the first protocol error for the packet.

6. The processing method according to claim 5, wherein
in the requesting retry of data for the packet, a process to request for retry from head data of the packet is performed.

7. The processing method according to claim 5,
further comprising determining whether the received protocol error is detected in a packet retransmitted by retry, and
wherein the requesting retry for data of the packet is performed when the protocol error has not been detected in a packet retransmitted by a retry request of the retry circuit itself.

* * * * *